Sept. 8, 1953     D. J. BERGMAN     2,651,565
APPARATUS FOR UNIFORM DISTRIBUTION AND CONTACTING
OF SUBDIVIDED SOLID PARTICLES
Filed May 2, 1951
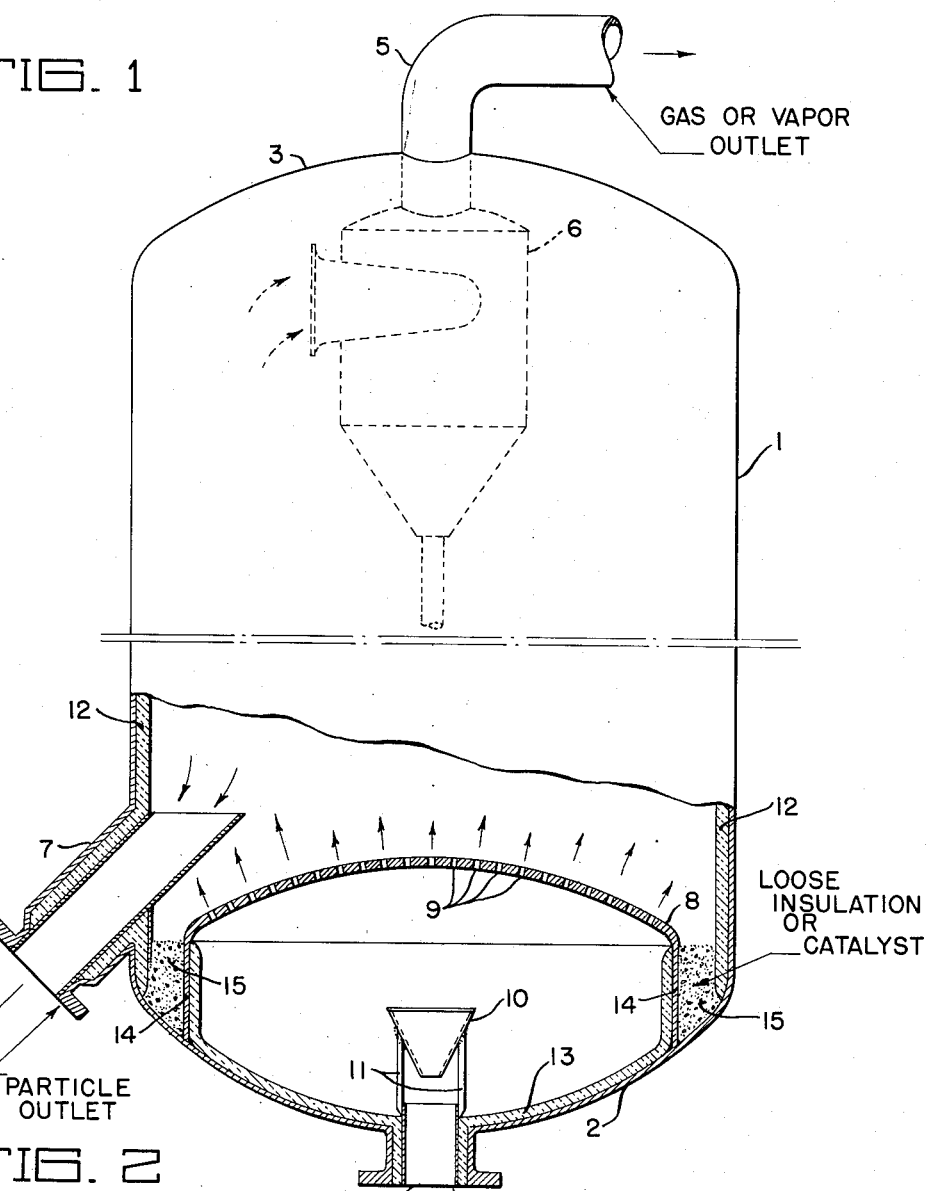
FIG. 1
FIG. 2
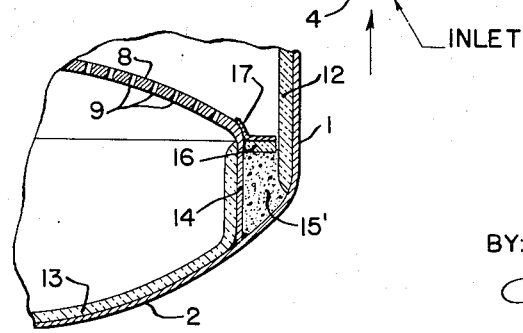
INVENTOR:
DONALD J. BERGMAN
BY:
Chester J. Giuliani
Philip T. Liggett
ATTORNEYS:

Patented Sept. 8, 1953

2,651,565

UNITED STATES PATENT OFFICE 2,651,565

APPARATUS FOR UNIFORM DISTRIBUTION AND CONTACTING OF SUBDIVIDED SOLID PARTICLES

Donald J. Bergman, Kenilworth, Ill., assignor to Universal Oil Products Company, Chicago, Ill., a corporation of Delaware Application May 2, 1951, Serial No. 224,237

3 Claims. (Cl. 23—288)

This invention relates to an improved apparatus for effecting the uniform distribution and contacting of subdivided solid particles and more particularly an improved arrangement and construction for supporting a distributing grid or perforated plate within the lower end portion of a confined particle contacting chamber.

While the present improved perforate plate or grid construction and supporting means may be utilized in connection with apparatus distributing a gaseous or vaporous stream, or even a liquid stream, to the interior of a confined contacting chamber, it is particularly useful in connection with the various fluidized processing operations, such as in a fluidized catalytic cracking unit. In a fluidized catalytic cracking unit, the reactor or regenerator has finely divided catalyst particles continuously fluidized and maintained in a state of turbulency by a gaseous or vaporous stream. The latter preferably contacts the particles uniformly in a fluidized bed which is maintained substantially across the entire cross-sectional area of the particular contacting chamber. The particles may be introduced into the upper portion or mid-portion of the chamber and descend through the fluidized bed countercurrently to a gaseous stream which is introduced into the lower portion of the chamber, or alternatively, the particles may pass upwardly and concurrently with the fluidizing gaseous reactant stream into the interior of the contacting chamber by means of a lower inlet. However, in either concurrent or countercurrent flow, it is desired that the fluid or fluidizing stream be substantially uniformly distributed across the entire area of the contacting chamber and it is a usual practice to maintain at least one perforate plate or distributing grid across a major portion of the cross-sectional area of the chamber such that the fluidizing stream is uniformly dispersed throughout the entire fluidized bed of material maintained in the chamber. In many reactors or contacting chambers, it is necessary to maintain an internal lining or insulation within the vessel in order to protect the wall of the chamber from excessively high temperature processing conditions, and it is within the lined vessels or chambers in particular that it is difficult to provide suitable means for holding a distributing grid or perforated plate across the chamber, because of the difference in expansion between the relatively cool insulated chamber wall and the heated internal distributing grid.

In the usual arrangement, the grid or perforate plate may be supported on beams, trusses, or such other supporting members which hold it in position across the chamber. Alternatively, a dome-shaped plate extends across the entire cross-sectional area of the chamber and is supported on a ring angle, bracket, or the like, which in turn is attached to the side wall of the chamber. Any cylindrical or circular section, when subjected to heat, will expand horizontally or diametrically substantially more than the internally insulated wall of the containing chamber. In an internally lined chamber, the perforate distributing grid plate must be bolted or clamped to the supporting means in a manner such that it can expand and slidably move, since the grid member will be at a substantially higher temperature than the relatively cool insulated wall of the chamber. It is also necessary in the usual arrangement to provide a sealing means for preventing gas or vapor flow around the periphery of the distributing means while supporting and maintaining the latter in position across the particle contacting chamber, so that gaseous or vaporous streams, with entrained particles, do not travel around the edge of the distributing member to erode and wear away the chamber insulation, or the chamber wall itself.

It is thus a principal object of the present invention to provide improved means for holding and maintaining a fluid distributing grid across a confined and insulated contacting chamber, such that temperature differentials between the perforated grid and supporting means connecting to the chamber may be accommodated without excessive stress in any one member due to the resulting differential expansions and deformations.

It is a further object of the present invention to use a substantially vertical insulated skirt member between the lower end of the vessel or chamber and the perforate plate or grid in a manner which allows natural expansion due to temperature differences, and thus the elimination of excessive thermal or expansion stresses and the need of a sliding type of supporting means between the grid and the chamber.

Broadly, the present invention embodies apparatus suitable for uniformly distributing and contacting subdivided particles at an elevated temperature, and comprising in combination, a confined chamber having at least one lower inlet means thereto and gas and particle outlet means therefrom, a perforate distributing plate spaced from and extending across the interior end portion of said chamber, an insulated vertically extending supporting skirt member extending interiorly from the end of the chamber to the perforate distributing plate, whereby the latter is maintained spaced from the end of the chamber and from the inlet means thereto, and insulation adjacent the supporting skirt member in a manner permitting a substantially uniform temperature gradient longitudinally therethrough.

In a more specific embodiment, the present invention provides means for installing a perforate plate within the lower portion of a contacting chamber, and comprising in combination, a substantially vertical skirt member extending interiorly and upwardly from the lower end of the confined chamber to the perforate distributing plate, the skirt member being connected to the chamber and spaced a relatively short distance from the side wall thereof, with insulation adjacent to and attached to the interior periphery of the skirt member, and substantially loose particulated or resilient material being placed around the exterior periphery of the skirt member, between the latter and the interior wall of the contacting chamber, whereby the skirt member may deflect or deform to accommodate differential temperatures from the upper hot end to the lower and cooler end.

Preferably the skirt member is welded to otherwise connect with the external periphery of the grid or distributing plate, and the latter preferably is dished or of elliptical shape such that it may be self-supporting across large diameter contacting chambers. The perforate distributing plate member is preferably of a diameter or cross-sectional area extending over a major portion of the chamber, so that the fluid medium being distributed upwardly into the interior of the contacting chamber is distributed substantially uniformly across the entire internal area thereof. The use of insulation on each side of the vertical skirt member provides a gradual and relatively uniform temperature gradient throughout the height of the skirt member, the upper end of the skirt member being at a temperature substantially equal to that of the distributing plate and the internal operating temperature of the contacting chamber, while the lower end of the skirt member, where it attaches to and is supported from the lower end of the chamber itself, is at substantially the same temperature as the insulated wall of the chamber. For example, in a fluidized catalyst regenerating chamber, wherein catalyst is oxidized and regenerated in the presence of air or an oxygen-containing stream to remove carbonaceous deposit, the operating temperature within the vessel may be of the order of from 1000° F. to 1300° F., while internal insulation is provided in the chamber to maintain or hold down the wall temperature in the chamber itself to say not more than about 300° to 400° F., in order that there be no loss of strength of the metal forming the particular contacting chamber.

The length of the supporting skirt in the chamber may be determined by both fluid distributing or construction considerations. However, the length of the skirt member may also be governed by temperature conditions within the interior of the chamber and the amount of insulation on the lower end of the chamber itself, which in turn governs the temperature differential between the interior operating conditions and the wall of the chamber itself. Preferably, the length of the skirt of the member is such that it has a relatively uniform temperature gradient longitudinally therethrough in the range of about 25° F. to 50° F. per inch of height and so that there is no excessive internal stresses within the member due to deformation or discontinuity with respect to other connecting members that result from differential temperature expansions. It is also desirable that the thickness of the skirt member be a minimum in order to reduce stresses therein as it is subjected to the high temperature at one end and maintained substantially cool at the other. In general, the stresses in a cylindrical form of skirt member, having one end heated and the other relatively cool, as provided by the present invention, will be reduced by the factors of maintaining a low and substantially uniform temperature gradient from one end to the other, utilizing adequate lengths or heights to provide the low temperature gradient per inch of length, as well as minimum thicknesses and resulting ability to deform with expansion without high internal stress.

In a high temperature contacting chamber, the diametrical and circumferential expansion of the upper end of the skirt member, particularly where it connects with the fluid distributing plate or grid, may be appreciable and of the order of several inches. It is therefore desirable to utilize a resilient type of insulation or a movable loose and granular type of insulating material between the skirt member and the wall of the chamber, so that there is no undue restraining or holding of the skirt member as it expands, or conversely as it contracts, due to temperature changes within the interior of the operating vessel. The upper portion of the skirt member expands and moves toward the insulated wall of the chamber, thus an unyielding type of insulation between the two concentric walls might cause excessive stresses in the skirt or chamber wall. A desirable insulating material, may be in some instances, made of a resilient mineral wool type of insulation, while a particulated or granular material may be vermiculite, or the like. However, preferably the material is such that it will not readily pack or be harmed by the particular temperature conditions involved. In fluid catalytic cracking processing units, a portion of the finely divided catalyst may be allowed to settle into the space around the skirt member and adjacent the lower portion of the wall of the chamber, and the catalyst itself thus acts as the insulating medium around the exterior surface of the skirt member. Block insulation, insulating concrete, and the like may be utilized on the interior wall of the perforated skirt member to provide the desired insulation between the supporting skirt and the high temperature processing fluid stream which is introduced upwardly through the perforated distributing grid member.

The construction and arrangement for supporting a perforate distributing grid member within the lower portion of a heated contacting chamber will be better explained upon reference to the accompanying drawing and the following description thereof, while still further advantages and features will also be noted in connection therewith.

Figure 1 of the drawing is an elevational view, partially in section, indicating one embodiment of supporting a fluid distributing grid or perforate plate within the lower portion of an insulated chamber in accordance with the present invention.

Figure 2 of the drawing, is a fragmentary sectional view of the lower portion of a contacting chamber, indicating a modification in the method of insulating externally around the plate supporting member.

Referring now to Figure 1 of the drawing, there is indicated an internally insulated contacting chamber 1 having a lower head 2 and an upper head 3. The lower head 2 has an inlet port 4, and the upper head 3 has an outlet conduit 5 which in turn connects with particle separating means 6, indicated internally within the upper portion of the chamber. The separator 6 is suitable for removing and retaining the finely divided particles which may be suspended with and carried with an exit gas stream being discharged from the upper portion of the chamber by way of outlet 5. Chamber 1 may for example be a reactor or regenerating chamber such as utilized in effecting the fluidized contacting of subdivided solid catalyst in a continuous catalytic conversion operation. A particle outlet 7 is indicated at the lower side portion of the chamber 1, and is suitable for continuously withdrawing contacted particles from the chamber. Where such a chamber is utilized in fluidized catalyst contacting, the finely divided particles may be introduced into the chamber by way of inlet 4, suspended in a fluidizing and contacting reactant stream, or alternatively, the particles may be introduced into a mid-portion of the chamber by way of an inlet not indicated in the drawing, and fluidized and contacted by a fluid reactant medium being introduced alone through the inlet 4. The fluid medium passes continuously upwardly through the bed of particles in the chamber and resulting contacted particles are continuously withdrawn by way of the particle outlet 7. In a hydrocarbon conversion chamber, the hydrocarbon vapors would be introduced upwardly through the inlet 4 at the lower end of the chamber, while in a catalyst regenerating chamber, an air or oxygen-containing stream would be introduced upwardly through inlet 4 and into contact with the particles maintained in the lower body portion of the chamber 1.

For illustrative purpose, it will be assumed that the chamber 1 of the drawing is a particle regenerating chamber, with the particles being introduced to an upper or mid-portion of the chamber 1 by inlet means not indicated, and that an air or other free oxygen-containing stream is introduced upwardly into the lower portion of the chamber by way of inlet 4 and through the perforate dome-shaped or elliptically-shaped distributing plate 8 supported on a skirt member 14. The plate has a plurality of spaced holes 9 over the entire surface area thereof such that the air stream is substantially uniformly introduced upwardly into and through the entire cross-sectional area of the contacting chamber 1 and maintains the subdivided particles of catalyst therein in a uniformly fluidized bed. An air deflecting cone or baffle 10 is also indicated in the present embodiment has being supported from legs or support means 11, such that the air or oxygen stream is deflected somewhat from a concentrated high velocity stream which would otherwise tend to impinge against the central portion of the distributing plate 8 and pass through primarily only the center portion thereof into the fluidized bed of particles.

The internal wall surface of the regenerating chamber 1 is protected by a suitable layer, or layers, of insulating material 12, so that the steel wall of the chamber itself is not unduly heated by the high temperature operating conditions within the chamber. For example, within the usual fluidized catalytic cracking regenerating chamber, the normal temperature within the fluidized bed or internal portion of the chamber may be of the order of 1000 to 1200° F. The lower head 2 of the chamber is also insulated with a suitable insulating material 13, and the latter is indicated in the present embodiment as extending upwardly along the interior surface of the continuous grid supporting skirt member 14. The insulation 12 and 13, may be a poured-in-place refractory type of insulating concrete mixture, a gunnited or blown into place type of refractory mixture, or alternatively, a block type of insulation of mineral wool, or the like, having a hard surface thereon. The material used must of course be suitable to withstand the high temperature conditions within the chamber as well as provided sufficient thickness to maintain a substantially low wall temperature for the chamber 1 and the lower head 2, of the order of say not more than about 300 to 400° F.

In the present embodiment, the supporting skirt 14 is a continuous cylindrical segment being welded to or otherwise connected at its lower end to the head 2, and welded or otherwise attached at its upper end to the external periphery or edge of the perforate grid or plate 8. The skirt member 14 may generally be of a relatively thin plate, but of course is of such thickness as to provide adequate strength for holding the perforated grid plate 8. Under operating conditions, a relatively large total pressure may be exerted upwardly against the underside of the perforate plate 8 by virtue of the upwardly flowing fluid stream entering inlet 4 and the pressure drop taken by the plate itself, while conversely under conditions having the fluid flow stop through inlet 4, a relatively heavy superimposed loading may be exerted by the bed of settled material over the plate 8 and within the lower portion of the chamber 1.

A loose insulation fill 15 is maintained circumferentially around the skirt member 14, between the latter and the inside wall of the chamber 1, or more specifically, inside of the lower end of the refractory insulation 12. The loose insulation 15 may be as hereinbefore noted, loose vermiculite, or other granulated insulating material that may be loosely placed in the pocket-like zone, and provide the desired external insulation around the skirt member 14. As also previously noted, the loose material 15 may comprise subdivided particle catalyst which in a fluidized catalytic cracking unit would settle into the pocket or dead space up to the level of the perforate grid member 8, where the lower peripheral holes therethrough would tend to remove and fluidize the material as it tended to settle over the grid or perforate plate itself.

In some instances, the perforate grid plate 8 may be elevated to a considerable height above the lower end of the vessel chamber 1, and proportionately higher than that indicated in the present drawing. However, in general, the perforate plate 8 is maintained relatively low within the bottom of the chamber and the height or length of the skirt supporting member 14 is no more than that necessary to maintain a relatively uniform temperature gradient from the top thereof to the bottom where it connects with the lower head of the chamber, and thus provide a member which expands naturally between the two different temperature points without excessive thermal or internal stresses in the metal itself. Preferably, the temperature gradient along the height of the skirt member 14 is maintained such that it is not more than about 25° F. per inch. Thus, for example, assuming an internal operating temperature of about 1100° F., where the outer periphery of the perforate plate 8 connects with the upper end of the skirt member 14, and an insulated chamber head 2 temperature of about 350° F., where the lowered end of the skirt member 14 connects with the head 2, there is a temperature differential of 750° F. which would require a skirt height of 30 inches to provide the 25° F. per inch temperature gradient from one end to the other.

In Figure 2 of the drawing, there is shown an alternative construction for maintaining a loose insulating fill material, indicated as 15', around the outer periphery of the skirt member 14 and in the pocket-like zone between the latter and the lower inside portion of the insulation 12 on the wall of the chamber. A layer of block-type insulation 16, or other refractory covering layer, is placed around the edge of the perforate plate member 8 and on top of the loose fill 15' in order that the latter is not fluidized or displaced from its desired position. There is thus provided a constant uniform depth of insulation around the entire periphery of the supporting skirt member 14 which is of yielding nature. The block insulation 16 may in turn be held in place by suitable metal clips or a ring 17 extending over the top of the insulation block 16 and from the edge of the perforate plate member 8.

While the improved grid supporting means of this invention is particularly useful in connection with high temperature type of contacting chambers, which have internal insulation, and eliminates the necessity of sliding or movable supporting means between the perforate grid plate and the wall of the chamber, and accompanying undesirable seals around the supporting means, the present construction may also be utilized to provide a simple supporting means for a lower internal perforate grid plate or such other related equipment which extends substantially across the entire cross-sectional area over the lower portion of any type of relatively cool contacting chamber. It may also be noted that while in a preferred construction, the skirt member 14 connects with the outer periphery of an elliptical or dome-shaped perforate grid plate, such as 8, that a ribbed or trussed substantially flat grid plate may also be utilized as the distributing member and a substantially vertical supporting skirt member, such as 14, may be utilized to provide the support for the grid member. The present construction may also be utilized in connection with a conically shaped lower head for a contacting chamber, and need not be limited to use only with a semi-elliptical head, such as indicated in the present drawing.

I claim as my invention:

1. Apparatus for uniformly distributing and contacting subdivided particles at an elevated temperature which comprises a vertical contacting chamber having a bottom closure head provided with a fluid inlet therethrough, a fluid outlet at the upper portion of the chamber, a perforated distributing plate extending across the lower portion of the chamber above said bottom closure head and terminating short of the side walls of the chamber, a supporting skirt member extending upwardly from said head to the peripheral portion of said plate, a stationary, loose insulation fill in the space between said skirt member and the side walls of the chamber, and a particle outlet for said chamber intermediate said fluid outlet and said plate.

2. Apparatus for uniformly distributing and contacting subdivided particles at an elevated temperature which comprises a vertical contacting chamber having a bottom closure head provided with a fluid inlet therethrough, a fluid outlet at the upper portion of the chamber, a perforated distributing plate extending across the lower portion of the chamber above said bottom closure head and terminating short of the side walls of the chamber, a supporting skirt member extending upwardly from said head to the peripheral portion of said plate, a relatively stationary filling of resilient refractory insulating material in the space between said skirt member and the side walls of the chamber, a layer of insulation material attached to the opposite side of said skirt member, and a particle outlet for said chamber intermediate said fluid outlet and said plate.

3. The apparatus of claim 1 further characterized in that said insulation fill is covered by a retaining ring of refractory material disposed between the periphery of said plate and the side walls of the chamber.

DONALD J. BERGMAN.

References Cited in the file of this patent

UNITED STATES PATENTS

| Number | Name | Date |
|---|---|---|
| 2,500,519 | Clark | Mar. 14, 1950 |
| 2,548,026 | Kaasa | Apr. 10, 1951 |